United States Patent [19]

Yamada

[11] Patent Number: 4,776,601
[45] Date of Patent: Oct. 11, 1988

[54] STEEL LAMINATE GASKET WITH POSITIONING DEVICE

[75] Inventor: Yoshio Yamada, Koshigaya, Japan

[73] Assignee: Ishikawa Gasket Co., Ltd., Tokyo, Japan

[21] Appl. No.: 40,435

[22] Filed: Apr. 20, 1987

[30] Foreign Application Priority Data

Nov. 18, 1986 [JP] Japan .............................. 61-177086[U]

[51] Int. Cl.$^4$ .............................................. F16J 15/08
[52] U.S. Cl. .................................... 277/232; 277/166; 277/234; 277/235 B
[58] Field of Search ..................... 277/235 B, 232, 233, 277/234, 235 R, 166; 123/193 H, 188 P, 190 E, 193 CH; 33/644, 645, 550

[56] References Cited

U.S. PATENT DOCUMENTS

| | | | |
|---|---|---|---|
| 2,034,610 | 3/1936 | Dickson | 277/232 |
| 2,884,100 | 4/1959 | McKee, Jr. | 277/166 X |
| 4,328,772 | 5/1982 | Heydrich et al. | 123/193 CH |
| 4,369,980 | 1/1983 | Backlin | 277/235 B |
| 4,561,634 | 12/1985 | Zeilinger | 277/235 B X |
| 4,648,607 | 3/1987 | Yamada et al. | 277/235 B |

FOREIGN PATENT DOCUMENTS 2717663 10/1978 Fed. Rep. of Germany ... 277/235 B

Primary Examiner—Allan N. Shoap
Attorney, Agent, or Firm—Frank J. Jordan; C. Bruce Hamburg; Manabu Kanesaka

[57] ABSTRACT

A steel laminate gasket is situated between two engine blocks, wherein one of the engine blocks has at least two positioning members for setting a location of the gasket. The gasket comprises at least one first plate having at least two first holes, and a second plate situated adjacent to the first plate and having at least two second holes. The diameter of the first hole is larger than that of the positioning member of the engine block, while the diameter of the second hole is essentially the same as that of the positioning member. The distance between the second holes is essentially the same as that between the two positioning holes. The second holes communicate with the first holes respectively so that the position of the gasket relative to the engine blocks can be determined exactly by the second holes engaging the positioning members of the engine block.

6 Claims, 2 Drawing Sheets

STEEL LAMINATE GASKET WITH POSITIONING DEVICE

BACKGROUND OF THE INVENTION AND RELATED ART STATEMENT

The present invention relates to a steel laminate gasket with positioning device for easily and exactly mounting the gasket onto an engine block when assembled.

In the past, steel plates constituting a steel laminate gasket are respectively provided with positioning holes therein. Generally, two positioning holes are formed on the gasket. The diameter of the positioning holes on the steel plate and the distance between the two positioning holes on the steel plate must be exactly the same on all steel plates.

Although the positioning holes are formed on the steel plates as exactly as possible, when the steel plates are stacked for assembly, the positioning holes may not align exactly. Sometimes, the positioning holes of the gasket may not be completely placed onto positioning members formed on the engine block. This is because although great accuracy is required in forming the positioning holes on the steel plate in regard to the diameter of the positioning holes and the distance between positioning holes, it is very difficult to form the accurate positioning holes on all steel plates and small error occurs.

Accordingly, one object of the present invention is to provide a steel laminate gasket with a positioning device, which obviates the drawbacks of the conventional gasket.

Another object of the present invention is to provide a steel laminate gasket as stated above, wherein the structure of positioning holes of the gasket is simplified.

A further object of the present invention is to provide a steel laminate gasket as stated above, wherein the positioning holes can be easily formed onto the steel plates.

A still further object of the present invention is to provide a steel laminate gasket as stated above, wherein the gasket can be economically manufactured.

Further objects and advantages of the invention will be apparent from the following description of the invention.

SUMMARY OF THE INVENTION

In accordance with the present invention, a steel laminate gasket is situated between two engine blocks, wherein at least one of the engine blocks is provided with at least two positioning members for setting a location of the gasket. The gasket comprises at least one first plate having at least two first holes, and a second plate situated adjacent to the first plate and having at least two second holes. The diameter of the first hole is slightly larger than that of the positioning member of the engine block, while the diameter of the second hole is essentially the same as that of the positioning member. Further, the distance between the two second holes is essentially the same as that between the two positioning members. The second holes communicate with the first holes so that the position of the gasket relative to the engine blocks can be determined exacly only by the second holes engaging the positioning members of the engine block. The first holes do not affect when the gasket is positioned.

The second plate may include an opening for a cylinder hole so that the location of the opening for the cylinder hole can be determined by the second plate. Further, the second plate may include a main portion, a curved portion facing the cylinder hole, and a flange partly located on the first plate. The main portion, the curved portion and the flange are integrally formed to constitute the second plate.

A plurality of intermediate plates may be situated between the first and second plates. On the other hand, a bottom plate may be situated under the second plate.

DETAILED DESCRIPTION OF PREFERRED EMBODIMENTS

Figure 1:
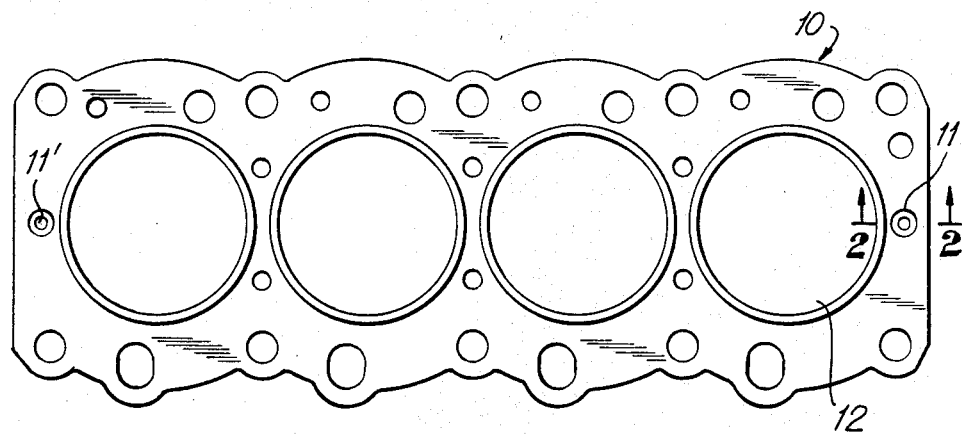
FIG. 1 is a plan view of a first embodiment of a steel laminate gasket of the present invention.
Figure 2:
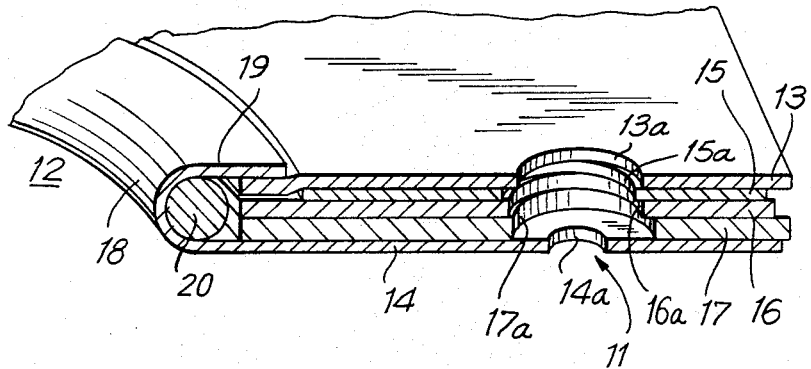
FIG. 2 is an enlarged perspective section view taken along a line 2—2 in FIG. 1.
Figure 3:
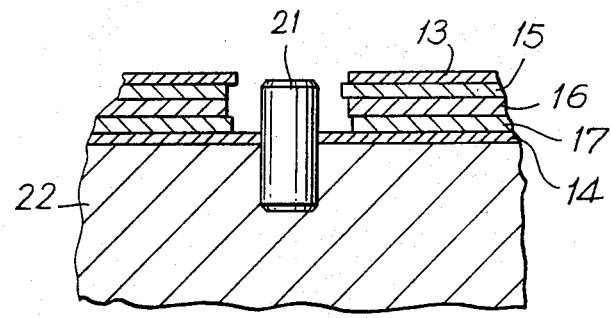
FIG. 3 is an explanatory section view for showing a condition that the first embodiment of the gasket is mounted on an engine block.

Referring to FIGS. 1-3, a first embodiment 10 of a steel laminate gasket of the invention is shown. The gasket 10 is provided with positioning holes 11, 11' as well as cylinder holes 12 and other holes, such as for water, oil, bolts and so on, as in the conventional gasket.

The gasket 10 comprises an upper plate 13, a lower plate 14 and three intermediate plates 15, 16, 17 situated between the upper and lower plates 13, 14. The lower plate 14 is provided with a curved portion 18 adjacent the cylinder hole 12, and a flange 19 mounted on a part of the upper plate 13. A seal ring 20 is situated adjacent to the curved portion 18.

The positioning hole 11' is formed exactly the same as the positioning hole 11, so that explanation is made with reference to the positioning hole 11 only.

The positioning hole 11 is constructed by an upper hole 13a on the upper plate 13, a lower hole 14a on the lower plate 14, and intermediate holes 15a, 16a, 17a on the respective intermediate plates 15, 16, 17. The diameter of the lower hole 14a is essentially the same as that of a positioning pin installed on an engine block 22 (FIG. 3), while the diameter of the other holes 13a, 15a, 16a, 17a is slightly larger than that of the positioning pin 21.

The distance between the holes 14a for the positioning holes 11, 11' must be essentially the same as the distance between the positioning pins 21 on the engine block. On the other hand, the distance between the other holes need not be precise as in the holes 14a. The holes 13a, 15a, 16a, 17a must be large enough to allow the positioning pin to pass therethrough without blocking.

Accordingly, when manufacturing the gasket 10, the holes 14a must be precisely formed on the lower plate 14. Careful attention must be made when forming the holes 14a on the lower plate 14. However, the holes 13a, 15a, 16a, 17a may be made roughly. Since the holes 13a, 15a, 16a, 17a can be formed roughly on the respective plates, these holes can be formed economically, and assembly of the plates can be made easily.

Even if the gasket are formed as explained above, the gasket 10 can be exactly mounted on the engine block 22. Further, the sealing ability is not affected by the positioning holes 11, 11'.

Figure 4:
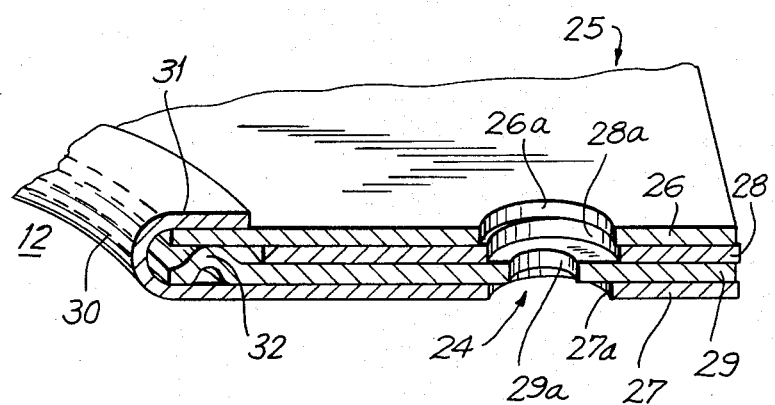
FIG. 4 is a perspective section view similar to FIG. 2 for showing a second embodiment of the present invention.

FIG. 4 shows a second embodiment 25 with positioning holes 24, 24' of a steel laminate gasket of the present invention. The gasket 25 comprises an upper plate 26 with a hole 26a, a lower plate 27 with a hole 27a, and two intermediate plates 28, 29 with holes 28a, 29a respectively.

The lower plate 27 is provided with a curved portion 30 and a flange 31 partly situated over the upper plate 26. The intermediate plate 29 is provided with a bead 32 adjacent the curved portion 30. The positioning hole 24 is constructed by the holes 26a, 27a, 28a, 29a, while the positioning hole 24' is constructed by the same holes (not shown).

In the gasket 25, the diameter of the hole 29a of the intermediate plate 29 is essentially the same as that of the positioning pin 21, while the diameter of the holes 26a, 27a, 28a is made slightly larger than that of the positioning pin 21. The distance of the holes 29a between the positioning holes 24, 24' must be essentially the same as the distance between the positioning pins 21. The distance between the other holes need not be precise as in the holes 29a.

In accordance with the present invention, one of the plates constituting the steel laminate gasket must have at least two holes, wherein the diameter of the hole is essentially the same as that of the positioning pin 21 and the distance between the two holes is essentially the same as that between the two positioning pins 21. In the cylinder head gasket, it is preferable to form required precise holes on a plate constituting or directly surrounding a combustion chamber of an engine so that the plate can be precisely situated on the engine.

While the invention has been explained with reference to the specific embodiments of the invention, the explanation is illustrative and the invention is limited only by the appended claims.

What is claimed is:

1. A steel laminate gasket adapted to be situated between two engine blocks, one of the engine blocks having at least two positioning members for setting a location of the gasket, comprising:
    at least one first plate including at least two first holes, each first hole having a diameter slightly larger than that of the positioning member of the engine block, and
    a second plate situated adjacent to the first plate and including at least two second holes, each having a diameter essentially the same as that of the positioning member of the engine block and a distance between the two second holes essentially the same as that between the two positioning members, said second holes communicating with the first holes so that position of the gasket relative to the engine blocks can be determined exactly only by the second holes engaging the positioning members of the engine block wherein said second holes are smaller in diameter than said first holes.

2. A steel laminate gasket according to claim 1, further comprising a plurality of intermediate plates situated between the first and second plates and having intermediate holes communicating with the first and second holes.

3. A steel laminate gasket according to claim 2, in which said second plate includes at least one opening for a cylinder hole so that location of the opening for the cylinder hole can be determined by the second plate.

4. A steel laminate gasket according to claim 3, in which said second plate includes a main portion, a curved portion integrally formed with the main portion and facing the cylinder hole, and a flange integrally formed with the curved portion, said flange being partly located over the first plate.

5. A steel laminate gasket adapted to be situated between two engine blocks, one of the engine blocks having at least two positioning members for setting a location of the gasket, comprising:
    at least one first plate including at least two first holes, each first hole having a diameter slightly larger than that of the positioning member of the engine block,
    a second plate situated adjacent to the first plate and including at least two second holes, each having a diameter essentially the same as that of the positioning member of the engine block and a distance between the two second holes being essentially the same as that between the two positioning members, said second holes communicating with the first holes so that position of the gasket relative to the engine blocks can be determined exactly only by the second holes engaging the positioning members of the engine block wherein said second holes are smaller in diameter than said first holes, and
    a bottom plate situated under the second plate and having at least two bottom holes with a diameter slightly larger than that of the positioning member of the engine block.

6. A steel laminate gasket according to claim 5, in which said second plate includes at least one opening for a cylinder hole and a bead surrounding the opening for a cylinder hole.

* * * * *